H. WIND.
AUTOMOBILE LOCKING DEVICE.
APPLICATION FILED NOV. 11, 1915.
1,193,652.
Patented Aug. 8, 1916.
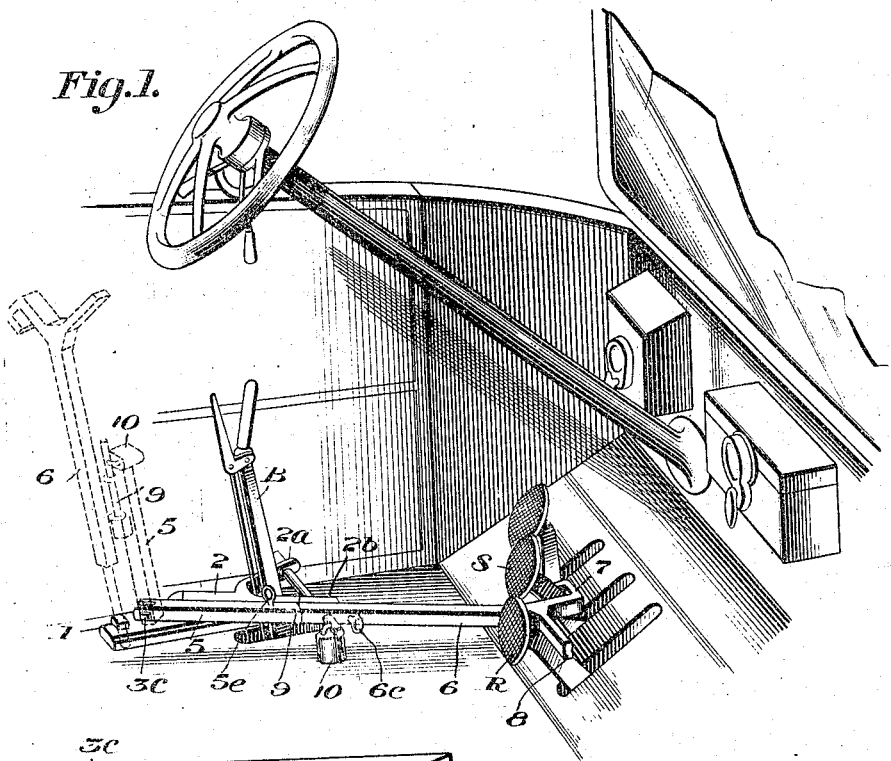
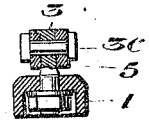
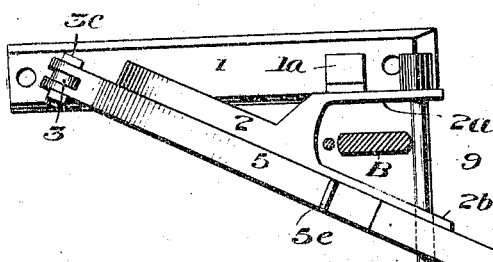
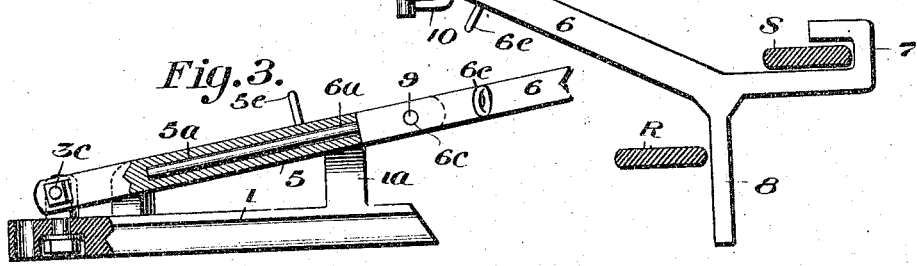
Witnesses
Philip E. Barnes
Grace K. Kiefer
Inventor
Henry Wind
By Alexander Dowell
Atty's

UNITED STATES PATENT OFFICE.

HENRY WIND, OF MOLINE, ILLINOIS.

AUTOMOBILE-LOCKING DEVICE.

1,193,652.

Specification of Letters Patent. Patented Aug. 8, 1916.

Application filed November 11, 1915. Serial No. 60,856.

*To all whom it may concern:*

Be it known that I, HENRY WIND, a citizen of the United States, residing at Moline, in the county of Rock Island and State of Illinois, have invented certain new and useful Improvements in Automobile-Locking Devices, of which the following is a specification.

This invention is a novel device for locking the brake and controlling devices of automobiles when unoccupied by the owner, so that the car cannot be surreptitiously removed or operated by thieves, joy-riders or other unauthorized persons.

The invention provides a novel locking device whereby the emergency brake can be locked in applied position, and the controlling levers of the car also locked when in neutral or inoperative position.

The invention consists in the novel construction of the locking device as hereinafter set forth in the claims; and the accompanying drawings illustrate one practical embodiment of the invention.

In said drawings:—Figure 1 is a perspective view of the locking device as applied to a well known form of automobile, and showing the parts locked. Fig. 2 is a plan view of the locking device detached. Figs. 3 and 4 are detail sectional views of parts of the locking device.

In the drawings B designates the emergency brake lever; S the speed or engine controlling lever and R the reverse controlling lever of a well known type of automobile.

In the embodiment of the invention illustrated in the drawings the locking device comprises a base plate 1 which is rigidly bolted to the floor or chassis of the car, and preferably adjacent the emergency brake lever. Rigidly attached to this base and preferably extending upwardly at an obtuse angle thereto is a locking member 2 having its front end slotted or bifurcated; one part 2$^a$ of the bifurcation being rigidly attached to a stud 1$^a$ on the base, and the other part 2$^b$ extending in line with the body of the member 2.

The base 1 is preferably so located relative to the emergency brake lever B that when the emergency brake is applied the lever B will enter the slot or bifurcation of member 2 as indicated in Fig. 1, and may be securely retained therein by means of a transverse locking member or bolt 9, as indicated in Figs. 1 and 2; which bolt has a suitable head on one end and its body is passed through suitable openings in the forward ends of the parts 2$^a$, 2$^b$ and its other end can be engaged by a hasp lock 10 or other suitable fastener, so that the emergency brake can thus be locked in applied position.

An eye-bolt 3 of any suitable construction is preferably pivotally attached to the base 1 as indicated in Figs. 3 and 4. Hingedly attached to the upper end of this eye-bolt as by means of an eye-bolt or pin 3$^a$, is an adjustable locking member which is preferably composed of a section 5 hinged to said eye-bolt, and a detachable section 6, having a shank 6$^a$ engaging a socket 5$^a$ in section 5 as indicated in Fig. 3. The section 6 has on its outer end a hook 7 which is adapted to engage the speed controlling lever S, see Figs. 1 and 2, when the latter is in neutral position, and it also has a laterally projecting finger 8 adapted to engage the reverse lever R when the latter is in neutral position, as indicated in Figs. 1 and 2. The section 6 also has a hole 6$^c$ in it that will come in line with the holes in the parts 2$^a$, 2$^b$ when section 6 is properly engaged with the levers S and R, and said hole 6$^c$ can then be engaged by the bolt 9 and locked thereby to hold the levers S and R in neutral position; while at the same time the emergency brake B can be also locked.

Section 5 may be provided with an eye 5$^e$, and section 6 with an eye 6$^e$; and when the adjustable locking member is not in use section 6 may be detached from section 5 and the latter swung to upright position, and the section 6 placed beside section 5, and the bolt 9 slipped through the eyes 5$^e$, 6$^e$ and secured by the lock 10, as indicated in dotted lines in Fig. 1, so that these parts can thus be conveniently kept together and out of the way. The locking members 5 and 6 might be made integral in some cases and swung up out of the way when not in use.

To apply the lock the section 5 is lowered beside the member 2, and the hook 7 on section 6 is engaged in front of the lever S when the latter is retracted, and finger 8 is engaged in front of lever R when the latter is retracted; and the emergency brake is applied. Then the bolt 9 is passed through the holes in parts 2$^a$, 2$^b$, and section 6, and secured by the lock 10 as indicated in Fig. 1.

When the locking devices are thus applied and secured the speed control lever and the reverse control lever are locked in neutral positions, so that the machine cannot be started; and the emergency brake is also locked in applied position as an additional precaution against the machine being improperly started or accidentally coasting.

The locking device is very efficient and obviously can be readily adapted to suit other types of machines than that indicated in the drawings, and I do not consider the invention restricted to the specific construction of parts shown.

What I claim is:

1. Automobile locking devices comprising a base member adapted to be attached to the vehicle, a member attached to the base adapted to be engaged by the brake lever when the latter is in applied position, and a member adjustably attached to said base adapted to engage the controlling levers to hold the same in neutral position, with a common locking means for locking said members when in applied positions, substantially as described.

2. In a locking device of the character specified, the combination of a base, a member rigidly connected therewith and having a slot or bifurcation adapted to receive the brake lever when the latter is in applied position, a member connected with the base adapted to engage the speed lever and the reverse lever when the same are in neutral positions, and a locking bolt adapted to transfix the bifurcation and the said member to hold the brake lever in applied position and the speed and reverse levers in neutral position, substantially as described.

3. In a locking device of the character specified the combination of a base, a member connected therewith adapted to engage and hold the brake lever when the latter is in applied position, a second member adapted to engage the speed lever and the reverse lever when the same are in neutral position and a common locking means for locking said members in applied positions.

4. In an automobile lock the combination of a base member adapted to be attached to a vehicle, a bifurcated member attached to the base and adapted to engage the brake lever when in applied position, and an adjustable member attached to said base adapted to engage the speed and reverse levers to hold the same in neutral position, and a common locking means for locking said members in applied positions, substantially as described.

5. In combination a base member, a member rigidly connected therewith, having a bifurcation adapted to receive the brake lever when in applied position, an adjustable member attached to this base adjacent the first member and provided with portions adapted to respectively engage the speed lever and reverse lever and hold same in neutral position, and a common locking means adapted to engage the bifurcation and said adjustable member to hold same in locking position, substantially as described.

6. In a locking device of the character specified the combination of a base, a bifurcated member rigidly connected therewith and adapted to engage the emergency brake lever when the latter is in applied position, and a member pivoted upon this base adapted to lie beside the first member, said member being adjustable and provided with a hook adapted to engage the speed lever and with a finger adapted to engage the reverse lever when the same are in neutral position, and a common locking means for locking said members when in applied positions.

7. In a locking device of the character specified the combination of a base, a bifurcated member rigidly connected therewith and having a slot or bifurcation adapted to receive the emergency brake lever when the latter is in applied position, and a member pivoted upon this base adapted to lie beside the first member, said member being adjustable and provided with a hook adapted to engage the speed lever and with a finger adapted to engage the reverse lever when the same are in neutral position; with a locking pin adapted to transfix the bifurcation and said adjustable member to lock the brake lever in applied position and the speed and reverse levers in neutral position, substantially as described.

In testimony that I claim the foregoing as my own, I affix my signature in presence of two witnesses.

HENRY WIND.

Witnesses:
  H. H. WILLIAMS,
  L. W. LARSON.